(12) United States Patent
Thompson

(10) Patent No.: US 9,597,614 B2
(45) Date of Patent: Mar. 21, 2017

(54) BACKFLOW COLLECTION SYSTEM AND METHOD FOR RECLAIMING THE SAME

(71) Applicant: Grandbury Thompson Group,LLC, Grandbury, TX (US)

(72) Inventor: Bruce Thompson, Granbury, TX (US)

(73) Assignee: Granbury Thompson Group, LLC, Grandbury, TX (US)

( * ) Notice: Subject to any disclaimer, the term of this patent is extended or adjusted under 35 U.S.C. 154(b) by 381 days.

(21) Appl. No.: 13/735,879

(22) Filed: Jan. 7, 2013

(65) Prior Publication Data
US 2013/0186622 A1    Jul. 25, 2013

Related U.S. Application Data

(63) Continuation-in-part of application No. 12/685,549, filed on Jan. 11, 2010, now Pat. No. 8,449,779.
(Continued)

(51) Int. Cl.
*E21B 21/06* (2006.01)
*B01D 21/24* (2006.01)
(Continued)

(52) U.S. Cl.
CPC ....... *B01D 21/245* (2013.01); *B01D 21/2461* (2013.01); *B01D 21/2494* (2013.01);
(Continued)

(58) Field of Classification Search
None
See application file for complete search history.

(56) References Cited

U.S. PATENT DOCUMENTS 3,766,059 A   10/1973   Sasaki
3,865,727 A   2/1975   Broling et al.
(Continued)

FOREIGN PATENT DOCUMENTS

CN      2109238 U    7/1992
CN    202140074 U    2/2012
(Continued)

OTHER PUBLICATIONS

Translated WO1999020873A1, accessed Feb. 13, 2015.*
(Continued)

*Primary Examiner* — Duane Smith
*Assistant Examiner* — Phillip Shao

(57) ABSTRACT

Provided is a backflow collection system that includes a collection vessel having an upper section and a lower section, the collection vessel having a side opening configured to receive backflow from an oil/gas well, as well as a discharge port proximate an upper end of the upper section configured to discharge pressurized gas from the collection vessel. The backflow collection system may further include an auger coupled proximate the lower section of the collection vessel, the auger configured to receive solid and liquid matter from a bottom opening in the lower section, and when elevated remove at least a portion of the solid and liquid matter from the collection vessel, the collection vessel designed such that when fluid is contained therein it acts as a liquid/gas seal to prevent the pressurized gas from exiting through the bottom opening in the lower section of the collection vessel.

20 Claims, 10 Drawing Sheets

Related U.S. Application Data

(60) Provisional application No. 61/583,499, filed on Jan. 5, 2012, provisional application No. 61/143,693, filed on Jan. 9, 2009.

(51) Int. Cl.
  *E21B 43/34* (2006.01)
  *B65G 33/10* (2006.01)
  *B65G 33/26* (2006.01)
  *B01D 21/00* (2006.01)

(52) U.S. Cl.
  CPC ........... *B65G 33/10* (2013.01); *B65G 33/265* (2013.01); *E21B 21/063* (2013.01); *E21B 21/065* (2013.01); *E21B 43/34* (2013.01); *B01D 21/0015* (2013.01); *B01D 2221/04* (2013.01)

(56) References Cited

U.S. PATENT DOCUMENTS

| | | |
|---|---|---|
| 3,966,607 A | 6/1976 | Gaynor et al. |
| 4,245,396 A | 1/1981 | Maffet |
| 4,247,312 A | 1/1981 | Thakur et al. |
| 4,384,955 A | 5/1983 | Nakakura |
| 4,915,830 A | 4/1990 | Mackay et al. |
| 4,999,103 A | 3/1991 | Bogart |
| 5,316,029 A | 5/1994 | Campbell et al. |
| 5,338,451 A | 8/1994 | Lindberg et al. |
| 5,368,731 A | 11/1994 | Pesotini |
| 5,570,749 A | 11/1996 | Reed |
| 5,676,827 A | 10/1997 | Bruke |
| 5,928,519 A | 7/1999 | Homan |
| 6,096,201 A * | 8/2000 | Bruke ............ 210/155 |
| 6,328,118 B1 | 12/2001 | Karigan et al. |
| 6,451,213 B2 | 9/2002 | Huebner |
| 6,790,349 B1 * | 9/2004 | Sawyer ............ 210/173 |
| 6,915,896 B2 | 7/2005 | Jones |
| 7,198,659 B1 * | 4/2007 | Fanguy ............ 95/267 |
| 8,152,911 B1 | 4/2012 | Williams et al. |
| 8,202,336 B1 * | 6/2012 | Moe et al. ............ 55/318 |
| 2002/0162807 A1 | 11/2002 | Kulbeth |
| 2007/0075024 A1 | 4/2007 | Campbell et al. |
| 2008/0190668 A1 | 8/2008 | Swartout |
| 2010/0147779 A1 | 6/2010 | Miller |
| 2011/0061989 A1 * | 3/2011 | Thompson ............ 198/311 |
| 2012/0012309 A1 | 1/2012 | Noles, Jr. |

FOREIGN PATENT DOCUMENTS

| | | |
|---|---|---|
| EP | 0047347 A1 | 3/1982 |
| WO | WO9920873 A1 * | 4/1999 |
| WO | 2008058392 A1 | 5/2008 |
| WO | WO 2011057774 A2 * | 5/2011 |
| WO | 2011085218 A1 | 7/2011 |

OTHER PUBLICATIONS

Translated WO 2011057774 A2, accessed Feb. 18, 2015.*
Foreign Communication From a Related Counterpart Application, PCT Application No. PCT/US2014/010488; PCT Search Report and Written Opinion dated Nov. 7, 2014; 12 pages.

* cited by examiner

210

BACKFLOW COLLECTION SYSTEM AND
METHOD FOR RECLAIMING THE SAME

CROSS-REFERENCE TO RELATED APPLICATION

This Application is a continuation-in-Part of U.S. application Ser. No. 12/685,549 filed on Jan. 11, 2010 entitled "BACKFLOW COLLECTION RECEPTACLE AND METHOD FOR RECLAIMING THE SAME" to Bruce Thompson which claims the benefit of Provisional Application Ser. No. 61/143,693 entitled "Gas Buster/Sand Auger" to Bruce Thompson, filed on Jan. 9, 2009, as well as Provisional Application Ser. No. 61/583,499 entitled "Oil Super Loop" to Bruce Thompson, filed on Jan. 5, 2012, all of which are commonly assigned with the present disclosure and incorporated herein by reference as if reproduced herein in its entirety.

TECHNICAL FIELD

The present disclosure is directed, in general to a receptacle and more specifically, to a backflow collection receptacle and method for using the same.

BACKGROUND

Production of oil and gas (e.g., hydrocarbons) from subterranean formations is dependent on many factors. These hydrocarbons must usually migrate through a low permeable formation matrix to drain into the wellbore. In many formations, the permeability is so low that it hinders the well's production rate and overall potential. In other wells, the near wellbore is damaged during drilling operations and such damage often results in less than desirable well productivity. Hydraulic fracturing is a process designed to enhance the productivity of oil and gas wells or to improve the infectivity of injection wells.

In the fracturing process, a viscous fluid is injected into the wellbore at such a rate and pressure as to induce a crack or fracture in the formation. Once the fracture is initiated, a propping agent, such as sand (e.g., often referred to as "frac" sand), is added to the fluid just prior to entering the wellbore. This sand laden slurry is continuously injected causing the fracture to propagate or extend. After the desired amount of proppant has been placed in the reservoir, pumping is terminated, and the well is shut-in for some period of time.

After the pressure is released from the wellbore, the sand, or at least a significant portion of the sand, remains within the fractured strata thereby holding the strata in a substantially fractured state. Accordingly, the oil and gas is allowed to flow freely. Unfortunately, as the oil and gas begin to flow it starts to push other unwanted fluids and gasses, as well as some unwanted particulates from the strata (including, frac sand, salts, etc.) back to the surface.

A problem arises in how to deal with these unwanted fluids, gases and particulates. One gas byproduct of the fracking process of particular concern is hydrogen sulfide. Hydrogen sulfide is the chemical compound with the formula $H_2S$. Hydrogen sulfide is a colorless, very poisonous, flammable gas with the characteristic foul odor of rotten eggs. As hydrogen sulfide is extremely poisonous, and is often odorless in small concentrations, it is a significant concern during the collection of the unwanted fluid and particulates that backflow from the wellbore.

Accordingly, what is needed in the art is apparatus, and/or associated process, which addresses the aforementioned problems.

SUMMARY

To address the above-discussed deficiencies of the prior art, the present disclosure provides a backflow collection system. The backflow collection system, in one embodiment, includes a collection vessel having an upper section and a lower section, the collection vessel having a side opening configured to receive backflow from an oil/gas well, as well as a discharge port proximate an upper end of the upper section configured to discharge pressurized gas from the collection vessel. The backflow collection system, in this embodiment, further includes an auger coupled proximate the lower section of the collection vessel, the auger configured to receive solid and liquid matter from a bottom opening in the lower section of the collection vessel, and when elevated remove at least a portion of the solid and liquid matter from the collection vessel, the collection vessel designed such that when fluid is contained therein it acts as a liquid/gas seal to prevent the pressurized gas from exiting through the bottom opening in the lower section of the collection vessel.

Further provided is a method for reclaiming backflow from a wellbore. The method, in one embodiment, includes collecting solid and liquid matter from a wellbore within a backflow collection system, the backflow collection system being similar to the backflow collection system of the paragraph above. The method further includes operating the auger in a manner configured to remove at least a portion of the solid matter from the collection vessel while burning the pressurized gas exiting the discharge port.

BRIEF DESCRIPTION OF THE DRAWINGS

For a more complete understanding of the present disclosure, reference is now made to the following descriptions taken in conjunction with the accompanying drawings, in which.

DETAILED DESCRIPTION

Figure 1:
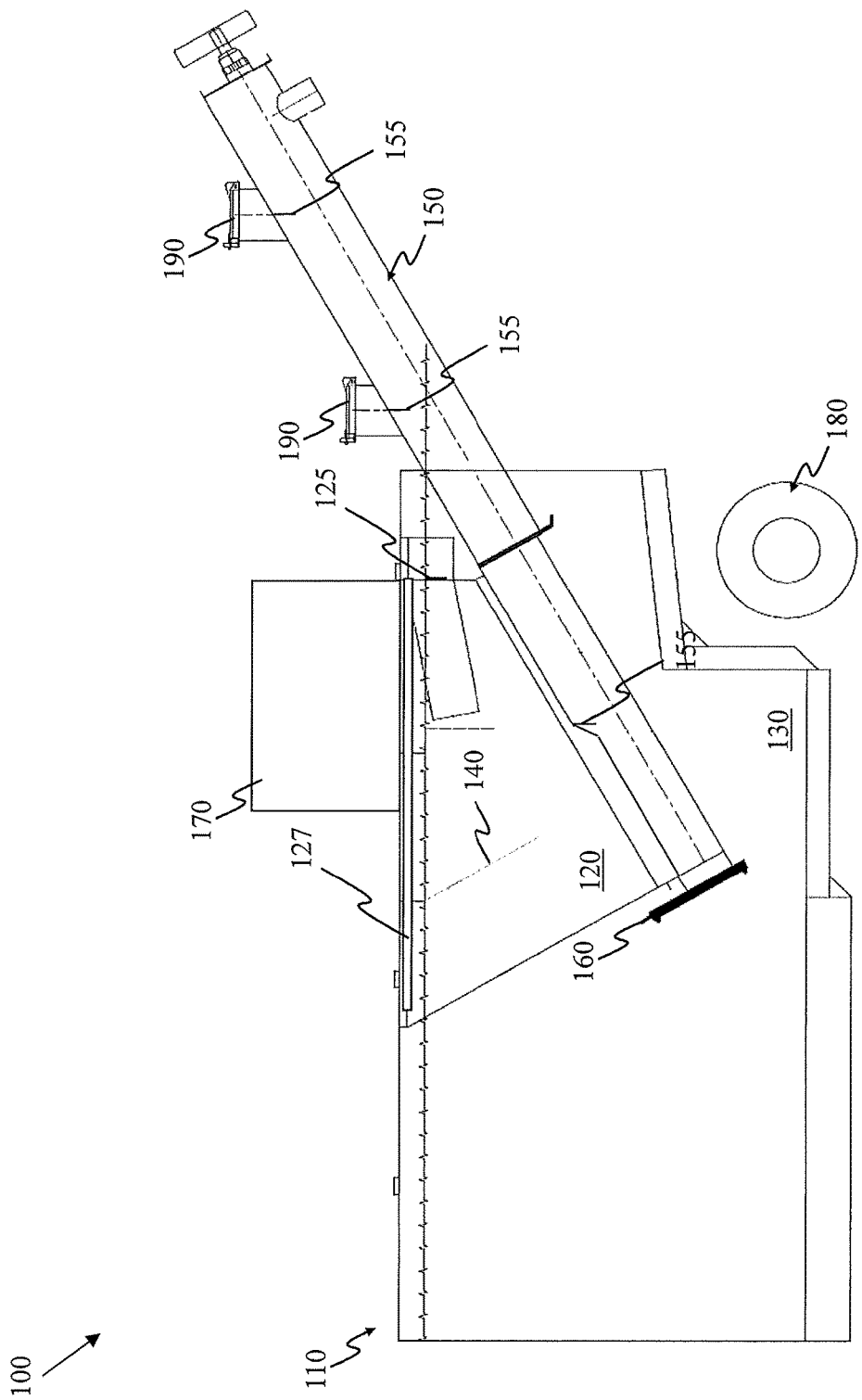
FIG. 1 illustrates a collection receptacle in accordance with the disclosure.

Referring initially to FIG. 1, illustrated is a collection receptacle 100 in accordance with the principles of the disclosure. The collection receptacle 100, as those skilled in the art appreciate, may be used to collect any number of different types of matter, including solid matter, liquid matter or a combination thereof. In one particular embodiment, the collection receptacle is configured to reclaim, including collecting and dispensing, backflow from a wellbore. For instance, the collection receptacle could be configured to reclaim fluid, hydrocarbons, frac sand, salts, etc., that would backflow from a wellbore after fracturing an oil and gas strata.

The collection receptacle 100 of FIG. 1 includes an enclosure 110. The enclosure 110, in this embodiment, is configured to collect solid and liquid matter. Moreover, the enclosure 110 of FIG. 1 includes a first portion 120 and a second portion 130. The first portion 120, in this embodiment, is configured to initially collect the solid and liquid matter. However, in this embodiment, the first portion 120 has an opening 125 (e.g., weir) in an upper region thereof. The opening 125, in one embodiment, is configured to allow excess collected liquid matter to overflow into the second portion 130 as the collected solid matter falls to a bottom of the first portion 120.

In one embodiment, the first portion additionally includes an emergency opening 127 configured to quickly divert extreme amounts of collected solid and liquid matter to the second portion 130. The purpose of the emergency opening 127, in this embodiment, is to prevent overflow of the collected liquid and/or solid matter from the enclosure 110 in the event the opening 125 cannot handle the volume of the incoming solid and liquid matter. As the emergency opening 127 is traditionally only used in extreme circumstances, the positioning of the emergency opening 127 is above the positioning of the opening 125. Accordingly, the emergency opening, in this embodiment, will only be employed in extreme circumstances. In the embodiment of FIG. 1, the opening 125 is located at the rear of the first portion 120, and the emergency opening 127 is located along the sides of the first portion 120. Nevertheless, the size, shape and location of each of the opening 125 and emergency opening 127 may be tailored on a use-by-use basis.

Located within the enclosure 110, and in this example the first portion 120, are one or more baffles 140. The baffles 140, in one example, are used to help direct the solid matter to the bottom of the first portion 120, among other uses.

The collection receptacle 100 further includes an elevated auger 150 extending into the enclosure 110, and more particularly the first portion 120 of the embodiment of FIG. 1. The auger 150, as would be expected, is configured to remove one or more contents from the enclosure 110. Nevertheless, in contrast to well known augers, the auger 150 is configured in such a way as to promote the separation of the solid matter from the liquid matter located within the enclosure 110, for example as the solid matter travels up the auger 150 and out of the enclosure 110. Specifically, the auger 150 of FIG. 1 includes a housing and a flighting, and in this embodiment the housing and flighting are configured in a manner to promote the aforementioned separation.

Figure 2A:
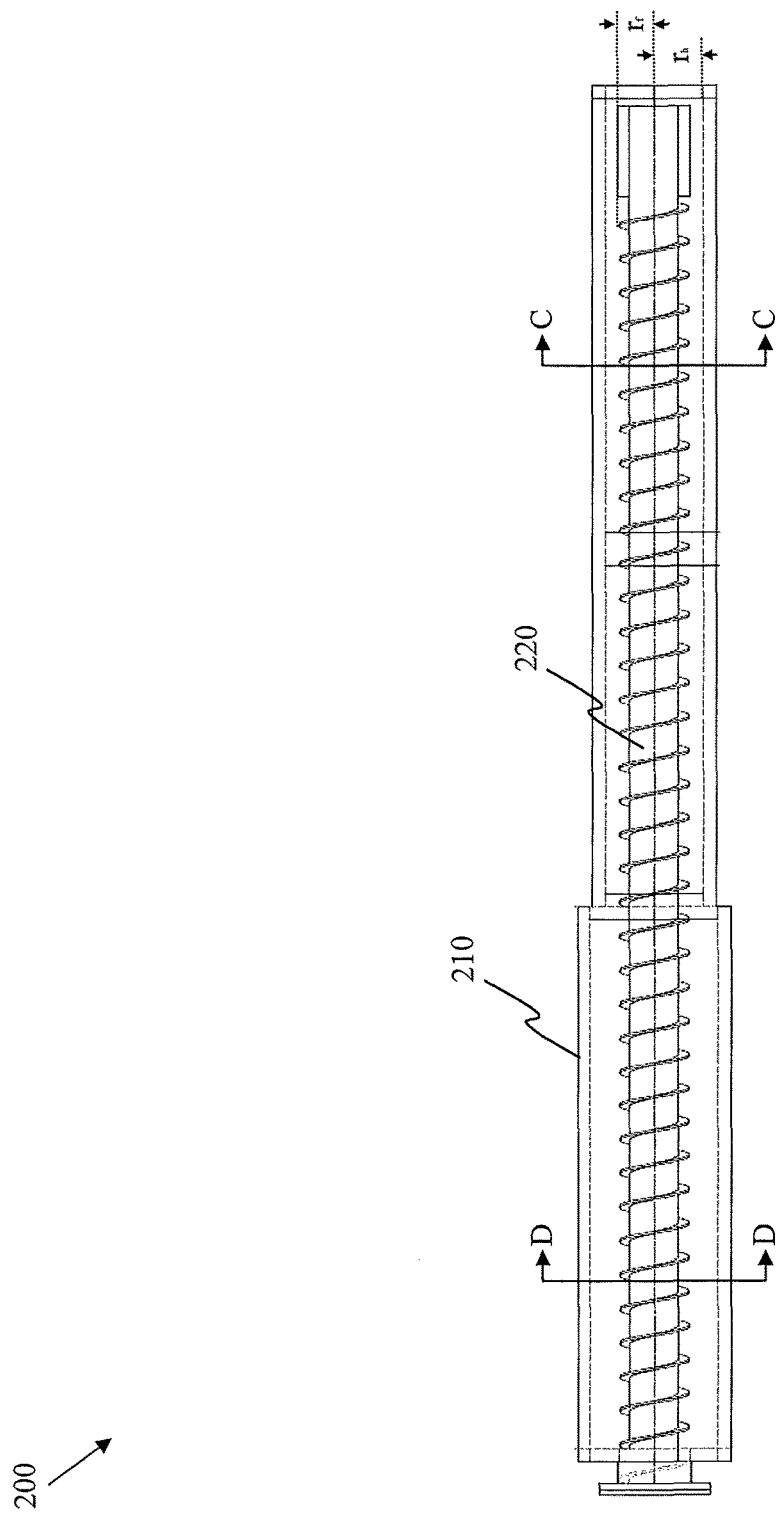
FIGS. 2A thru 2E illustrate various views of an elevated auger including a housing and a flighting.
Figure 2B:
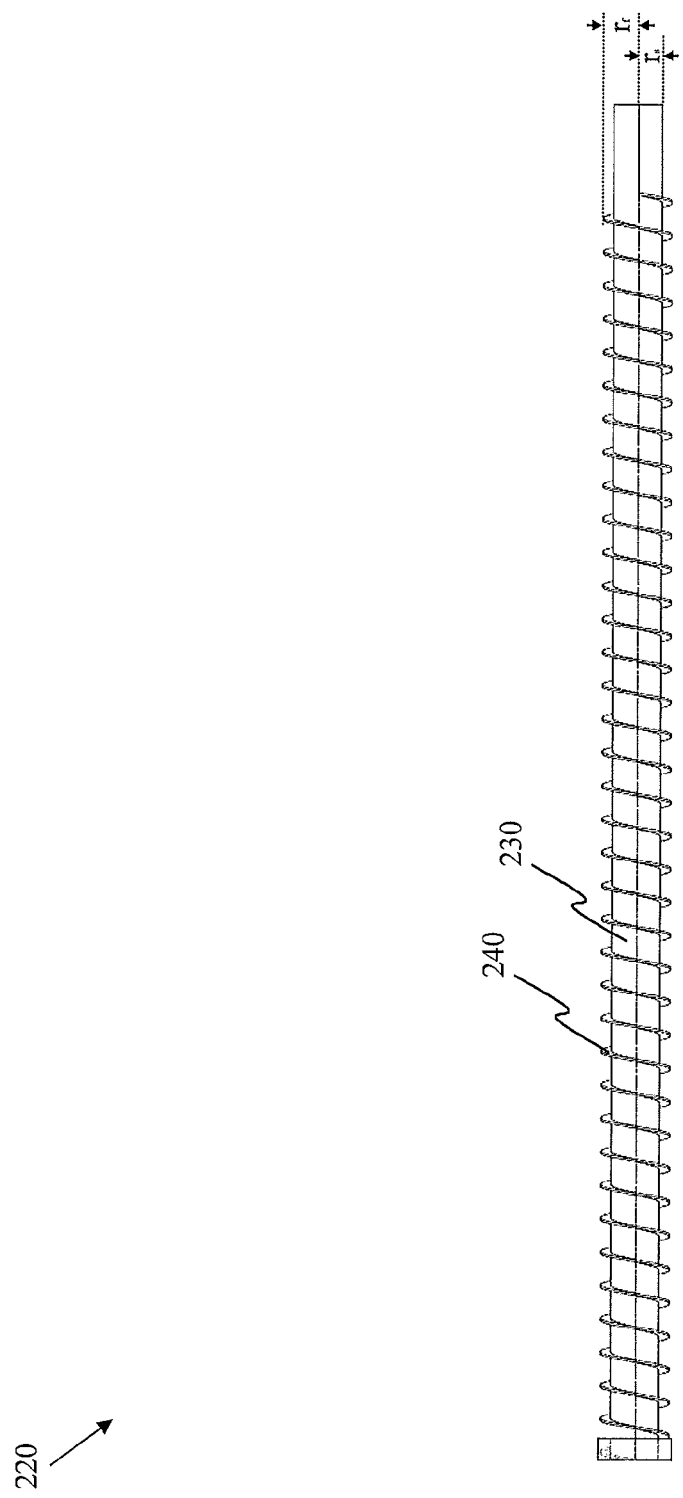
Figure 2C:
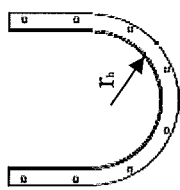
Figure 2D:
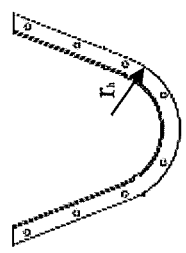

Turning briefly to FIGS. 2A thru 2D, illustrated are various views of an elevated auger 200 including a housing 210 and a flighting 220. FIG. 2A illustrates a cutaway view of the auger 200, whereas FIG. 2B illustrates the flighting 220, FIG. 2C illustrates a cross-section of the housing 210 taken through line C-C, and FIG. 2D illustrates a cross-section of the housing 210 taken through line D-D. In referring to the embodiment of FIGS. 2A thru 2D, the housing 210 has a radius $r_h$ and the flighting 220 has a lesser radius $r_f$, the difference in radius configured to promote separation of the solid matter from the liquid matter. Because of this lesser radius $r_f$ of the flighting 220, the auger 200 creates a solid matter tube surrounding the flighting 220 as the solid matter is removed from the enclosure. The term solid matter tube, as used herein, is intended to reference a tube like feature using the solid matter itself as the tube, as opposed to other rigid materials such as steel, iron, etc. The solid matter tube, a sand or mud tube in one example, provides a porous means for the liquid matter to travel back down the auger 200 as the solid matter travels up the auger 200. Likewise, as the solid matter travels up the auger 200 it is squeezed by the pressure of the solid matter tube against the flighting 220, thus further promoting the separation of the liquid matter.

The degree of difference between the housing radius $r_h$ and the flighting radius $r_f$ can be important to the ability of the auger 200 to promote separation. For instance, in one embodiment $r_f$ is less than about 90 percent of $r_h$. In yet another embodiment, $r_f$ is less than about 75 percent of $r_h$, and in yet another embodiment, $r_f$ is less than about 67 percent of $r_h$. For example, in the embodiment of FIGS. 2A thru 2D, $r_f$ ranges from about 5 inches to about 7 inches, whereas $r_h$ ranges from about 8 to about 9 inches.

It has been acknowledged that certain configurations of the auger 150 experience issues with the solid matter tube caving in, or sliding back down to the bottom of the first portion 120. This is particularly evident when the spacing between the flighting and the housing are large. This is also particularly evident in the embodiment wherein the centerline of the housing and centerline of the flighting do not coincide. Based upon this acknowledgment, and substantial experimentation, it has been recognized that blocks 155 (FIG. 1) may be placed between the flighting and housing at various positioned along the length thereof. The blocks 155, in this embodiment, typically extend from the inside wall of the housing toward the flighting, and in doing so help reduce the likelihood of the solid matter tube caving in. The blocks 155, in one embodiment, typically extend from the upper most inner surface of the housing toward the flighting, are located at one to six different locations, and are not required between the lower most inner surface of the housing and the flighting. Other configurations, beyond those just disclose, might also be used.

Turning now specifically to FIG. 2B, illustrated is the flighting 220. The flighting 220, as shown, includes a radius $r_f$. Likewise, a shaft 230 of the flighting 220 includes a radius $r_s$. To further promote the separation of the liquid matter from the solid matter, for example by way of increased pressing on the solid matter, the "teeth" 240 of the flighting 220 extend only a little way from the shaft. For example, in one embodiment, $r_s$ should be at least about 50 percent of $r_f$. In an alternative embodiment, $r_s$ should be at least about 65 percent of $r_f$, if not at least about 80 percent of $r_f$. For example, in the embodiment of FIG. 2B, $r_s$ ranges from about 3 inches to about 4 inches, whereas $r_f$ ranges from about 5 inches to about 7 inches. To further promote separation, the teeth 240 may include notches therein, for example notches extending into the teeth 240 about 0.25 inches to about 1 inch.

Turning now specifically to FIGS. 2C and 2D, illustrated are the cross-sections of the housing 210. As is illustrated in FIG. 2C, this portion of the housing 210 has a u-shaped trough cross-section. In contrast, as is illustrated in FIG. 2D, this portion of the housing 210 has a flare-shaped trough cross-section. Nevertheless, other cross-sections could be used.

Figure 2E:
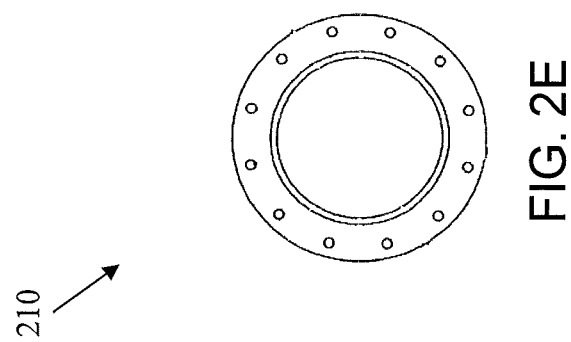

Turning briefly to FIG. 2E, illustrated is an alternative cross-sectional shape for the housing 210. In this embodiment, as shown, the housing 210 may have a circular cross-section. In this embodiment, the circular cross-section might have a radius ranging from about 8 to about 10 inches, and more particularly about 9 inches. As the radius of the flighting ($r_f$) is less than the radius of the circular cross-section of the housing 210, in this embodiment $r_f$ ranging from about 5 to about 7 inches, a solid matter tube will likely form. It should be noted that in certain embodiments a centerline of the flighting will coincide with a centerline of the circular housing 210. In other embodiments, however, the centerlines will not coincide. For example, in one known embodiment the centerline of the flighting will be closer to a bottom surface of the housing 210 than an upper surface of the housing 210. In this embodiment, the distance between the flighting and the bottom surface of the housing 210 will be less than a distance between the flighting and the top surface of the housing 210.

Figure 3:
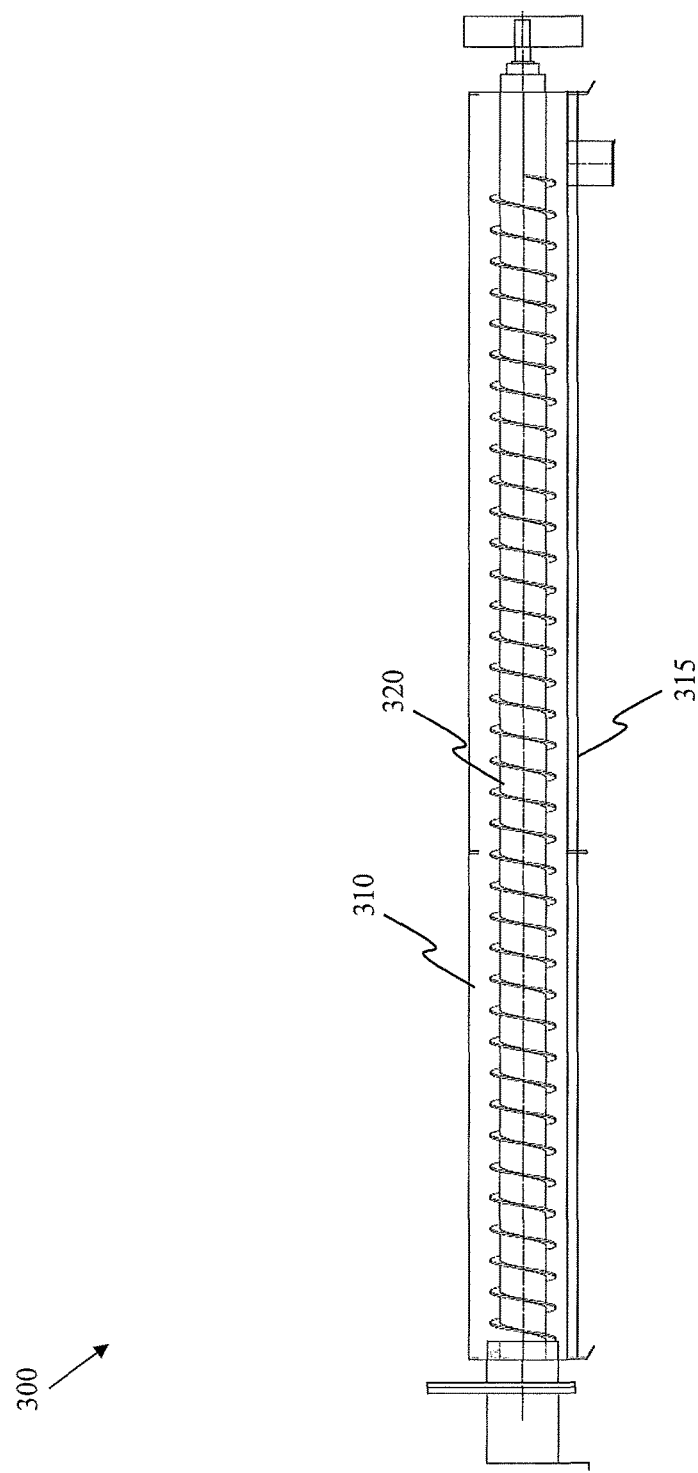
FIG. 3 illustrates an alternative embodiment of an elevated auger.

Turning now to FIG. 3, illustrated is an alternative embodiment of an elevated auger 300. The auger 300 of FIG. 3, in contrast to the degree of difference between the housing radius $r_h$ and the flighting radius $r_f$, includes a drain shoot 315 extending along a bottom surface of a housing 310 thereof. The drain shoot, regardless of the shape thereof, provides a pathway for excess fluid to travel back down the auger 300 as the solid matter travels up the auger 300. Accordingly, in this embodiment the housing 310 and the flighting 320 may have a somewhat similar overall shape and radius, but the added drain shoot 315 promotes the separation of the solid matter from the liquid matter. Accordingly, excess liquid matter squeezed from the solid matter travels down the drain shoot 315 as the solid matter travels up the auger 300.

Figure 4:
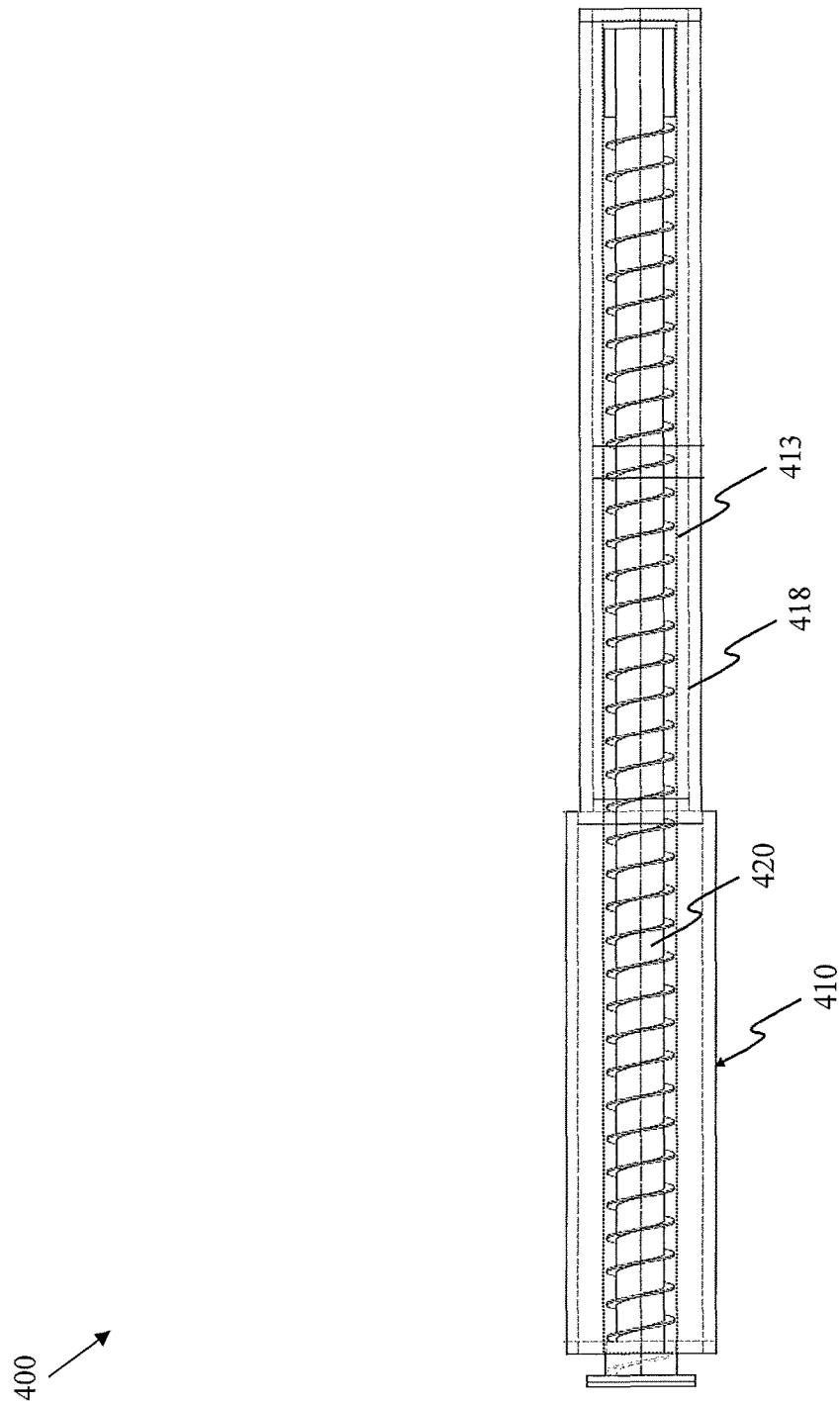
FIG. 4 illustrates yet another alternative embodiment of an elevated auger.

Turning now to FIG. 4, illustrated is an alternative embodiment of an elevated auger 400. The auger 400 of FIG. 4, in contrast to the degree of difference between the housing radius $r_h$ and the flighting radius $r_f$, includes a housing 410 having a first portion 413 and a second portion 418 and surrounding a flighting 420. In this embodiment, the first portion 413 is located between the second portion 418 and the flighting 420, and furthermore is perforated to promote the separation of the solid matter from the liquid matter. Accordingly, excess liquid matter squeezed from the solid matter exits the first portion 413 through the perforations therein, and then travels back down the auger 400 between the space separating the first and second portions 413, 418, respectfully.

Returning back to FIG. 1, the auger 150 includes a gate 160 at a bottom portion thereof. The gate 160, in this embodiment, is configured to allow solid matter to exit the auger 150 when operated in reverse. For example, certain situations may exist wherein solid matter remains within the enclosure 110, but there is a desire to fully empty the auger 150 of any solid matter. In this situation, the auger 150 could be operated in reverse, thereby emptying the auger 150 of any solid matter. The gate 160, in this example, allows the auger 150 to rid itself of solid matter without putting undue stress or torque on the auger 150 and/or its motor. Accordingly, the gate 160 may be opened when the auger 150 is run in reverse, and any solid matter within the auger 150 will be efficiently removed therefrom. In the embodiment shown, the solid matter exits into the second portion 130 of the enclosure 110.

The collection receptacle 100 of FIG. 1 further includes a gas buster 170 located between the enclosure 110 and a wellbore. The gas buster 170, as expected, is configured to dissipate energy associated with incoming solid and liquid matter. In the embodiment of FIG. 1, the gas buster 170 is coupled to an upper portion of the enclosure 110, for example near a rear thereof. The collection receptacle 100 of FIG. 1 further includes one or more wheels 180 coupled to the enclosure 110. The wheels 180 are configured to allow the collection receptacle 100 to roll from one location to another. Likewise, the auger 150 may include one or more inspection ports 190, for example with hinged covers.

A collection receptacle, such as the collection receptacle 100 of FIG. 1, may be used for reclaiming backflow from a wellbore. In one embodiment, solid and liquid matter originally enters the first portion 120 of the enclosure 110 through the gas buster 170. As the solid matter sinks to the bottom of the first portion 120, the liquid matter (e.g., the water, salts, and hydrocarbons) float to the top. As the solid and liquid matter continue to fill the first portion 120 of the enclosure 110, the liquid matter begins to flow through the opening 125 designed therein, to the second portion 130 of the enclosure 110. Once the solid matter approaches the top of the first portion 120 where the opening 125 exists, the first portion 120 will be substantially full of solid matter, while the second portion 130 of the enclosure 110 will primarily contain the liquid matter.

In certain embodiments, it is important that the revolutions per minute (rpm) of the flighting within the housing is slow enough to remove the solid matter from the enclosure, while allowing the liquid matter to be adequately removed there from. Accordingly, in direct contrast to traditional auger systems, the rpm of the flighting is intentionally kept slow. For example, in one embodiment the flighting has an rpm of about 15 or less. In other embodiments, an rpm of 12 or less provides advantageous results. In yet another embodiment, an rpm of 8 or less, and more particularly between about 4 and 8, provides superior results.

In this scenario, the liquid matter can be easily removed from the first portion 120 of the enclosure 110 without further contaminating the solid matter. The solid matter that exits the top of the auger 150 tends to be only slightly damp. Moreover, it is believed that this solid matter need not be decontaminated or reconditioned before being reused or introduced into the environment. Accordingly, the expense associated with this decontamination or reconditioning may be spared.

Figure 5:
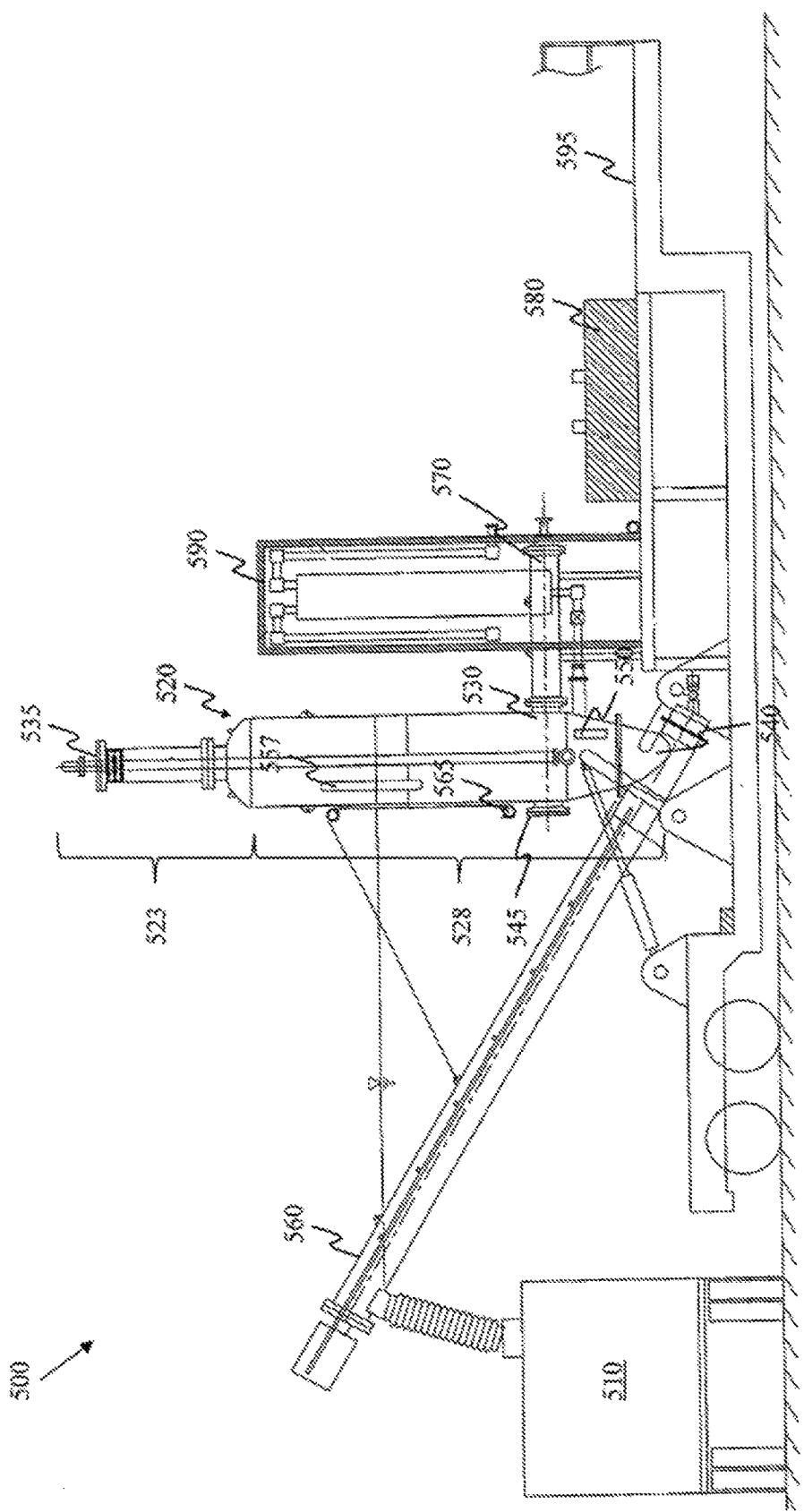
FIGS. 5-7 illustrate various different views of a backflow collection system manufactured and operated in accordance with this disclosure.

Turning to FIG. 5, illustrated is a backflow collection system 500 manufactured in accordance with the disclosure. The backflow collection system 500 includes a collection receptacle 510. The collection receptacle 510 is similar, in many ways to the collection receptacle 100 illustrated and discussed above. Accordingly, no further discussion is needed.

The backflow collection system 500 further includes a collection vessel 520 coupled to an auger 560. The collection vessel 520, in the illustrated embodiment, is configured as a vertical collection vessel. Such a configuration may be used to further help separate the solid and liquid matter from the gasses. The collection vessel 520, in one embodiment, includes an upper section 523 and a lower section 528. The lower section 528, in this embodiment, includes a side opening 530, while the upper section includes a discharge port 535. The side opening 530, in this embodiment, is configured to receive backflow from an oil/gas well. For example, the side opening 530 might comprise a pipe and flange configured to couple to an oil/gas well and receive backflow therefrom. The side opening 530 may be positioned at various different heights along the collection vessel 520. If the side opening 530 is positioned to near the bottom of the collection vessel 520, solid matter entering the collection vessel 520 may plug the side opening 530. In contrast, if the side opening 530 is positioned to near the top of the collection vessel 520, solid and liquid matter entering the collection vessel 520 may be pushed out the discharge port 535. The discharge port 535, in the illustrated embodiment, is configured to discharge pressurized gas received from the backflow from the oil/gas well from the collection vessel. One particular gas that may be discharged, and burned as it exits the discharge port 535, is hydrogen sulfide.

The auger 560, in the illustrated embodiment, is coupled proximate the lower section 528 of the collection vessel 520. The augur 560, in this embodiment, is configured to receive the solid and liquid matter from a bottom opening 540 in the lower section 528 of the collection vessel 520. When the auger 560 is elevated, and turned on, the auger 560 is configured to remove at least a portion of the solid and liquid matter from the collection vessel 520 while allowing the gasses to remain within the collection vessel 520, or alternatively exit the discharge port 535 in the upper end of the upper section 523 of the collection vessel 520. The auger may include a hoist 565, for example an electric hoist, to raise and lower the auger 560.

Bottom walls of the lower section 528 of collection vessel 520 may be slanted (e.g., from vertical) to assist the solid matter in exiting the bottom opening 540 into the auger 560. For example, the bottom walls of the lower section 528 might slant at an angle of at least about 45 degrees from vertical. In an alternative embodiment, bottom walls of the lower section 528 might slant at an angle of at least about 70 degrees from vertical.

A vibration mechanism 550 may be coupled to at least one of the collection vessel 520 or the auger 560. The term "vibration mechanism", as used herein, encompasses any device capable of providing vibrations to the collection vessel 520 in such a way as to assist the solid material from exiting the collection vessel 520 and entering the auger 560. The vibration mechanism 550, in this embodiment, is configured to assist the auger 560 receive solid matter from the bottom opening 540 in the lower section 528 of the collection vessel 520. In the illustrated embodiment, the vibration mechanism 550 is coupled to the lower section 528 of the collection vessel 520. Nevertheless, the vibration mechanism 550 could also be coupled to the auger 560. Any type of vibration mechanism 550, including pneumatic and electric based vibration mechanisms, are within the scope of the present disclosure.

The collection vessel 520 further includes abrasion plate 545 located on an opposing side of the collection vessel 520 as the side opening 530. The abrasion plate 545 is configured to receive the brunt of the abrasion/force of the solid and liquid matter as it enters the collection vessel 520. The abrasion plate 545 is an additional feature added to a typical collection vessel. In one embodiment, the abrasion plate 545 is replaceable. For example, a second side opening could be included within the collection vessel, the second side opening directly opposing the side opening 530. In this embodiment, the abrasion place 545 could be attached to the second side opening. Accordingly, the abrasion place could be easily replaced when needed. The collection vessel 520 may additionally include a sight liquid level indicator 557.

The backflow collection system 500 may further include a gas buster 570. The gas buster 570, in this embodiment, is configured to reduce a velocity of the solid and liquid matter exiting the oil/gas well and entering the collection vessel 520. The gas buster 570, in the illustrated embodiment, couples directed to a flange associated with the side opening 530 in the collection vessel 520. Other embodiments exist wherein the gas buster 570 is not directly coupled to the collection vessel 520, but is located more near the oil/gas well.

Figure 6:
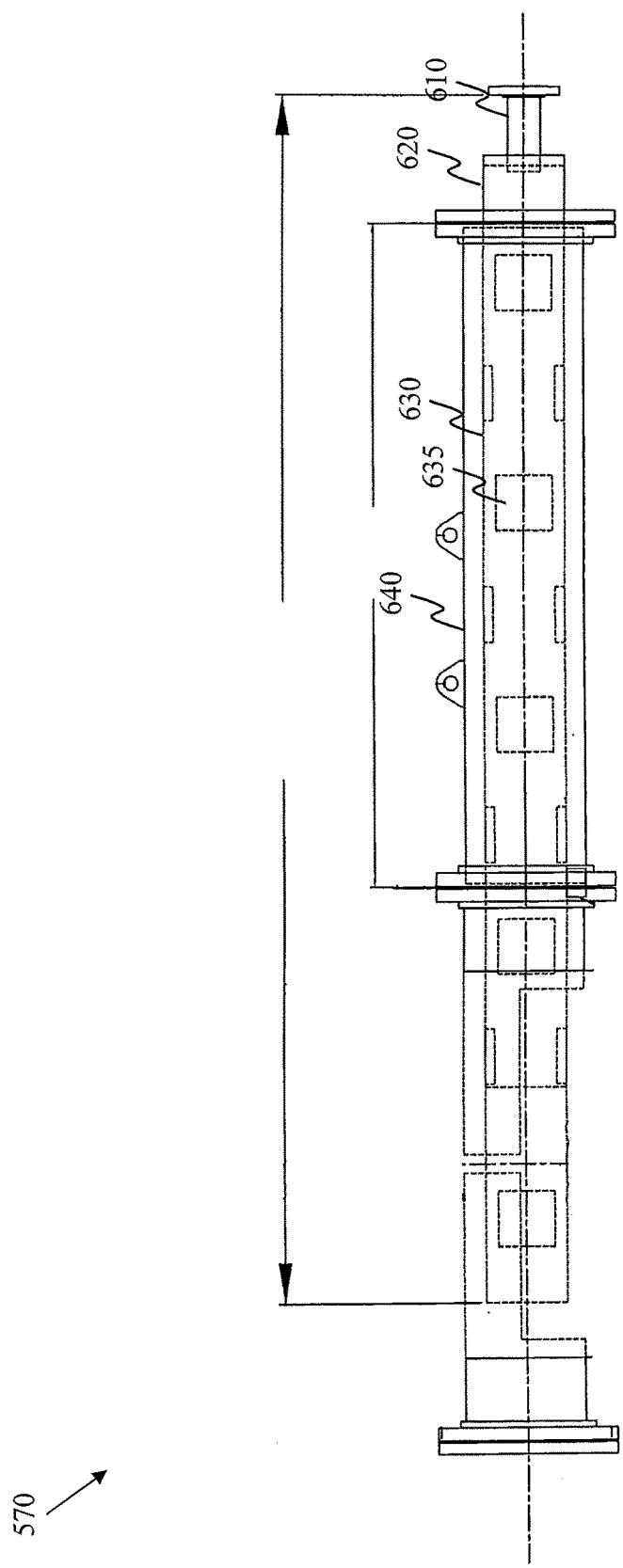

Turning briefly to FIG. 6, illustrated is an enlarged view of the gas buster 570 of FIG. 5. In the illustrated embodiment, the gas buster 570 includes a first section 610 and a second section 620. The first section 610, in this embodiment, includes a first cross-sectional area that is less than a second cross-sectional area of the second section 620. The increasing cross-sectional area of the gas buster 570 (e.g., as it approaches the collection vessel 520) is configured to reduce the velocity of the solid and liquid matter exiting the oil/gas well and entering the collection vessel 520. While the gas buster 570 only includes two steps in cross-sectional value, other embodiments may exist wherein three or more steps are used.

The gas buster 570, in the illustrated embodiment, further includes a first smaller pipe 630 that is encompassed by a second larger pipe 640. The first smaller pipe 630, in the illustrated embodiment, includes a plurality of openings 635 spaced along a length thereof. In fact, in the embodiment of FIG. 6, the openings 635 are sequentially spaced and rotated along the length of the first smaller pipe 630.

Returning to FIG. 5, the backflow collection system 500, in the illustrated embodiment, further includes a choke manifold 580 positioned between the side opening 530 in the collection vessel 520 and the oil/gas well. The choke manifold 580, in this embodiment, is configured to reduce a volume of the solid and liquid matter exiting the oil/gas well and entering the collection vessel 520. Those skilled in the art understand the various different choke manifolds 580 that might be used and remain within the purview of the present disclosure.

The backflow collection system 500, in the illustrated embodiment, may further include a high pressure sand trap 590 positioned between the side opening 530 in the collection vessel 520 and the oil/gas well. The high pressure sand trap 590, in this embodiment, is configured to remove a portion of the solid matter exiting the oil/gas well prior to entering the collection vessel 520. Those skilled in the art understand the various different high pressure sand traps 590 that might be used and remain within the purview of the present disclosure.

In the illustrated embodiment of FIG. 5, the collection vessel 520 and the auger 560 are position on a movable trailer 595. Further to the embodiment of FIG. 5, the gas buster 570, the choke manifold 580 and the high pressure sand trap 590 are also located on the movable trailer 595. In the illustrated embodiment, each of the collection vessel 520, auger 560, gas buster 570, choke manifold 580 and high pressure sand trap 590 are configured to transition from an operational positions to transit positions on the movable trailer.

Figure 7:
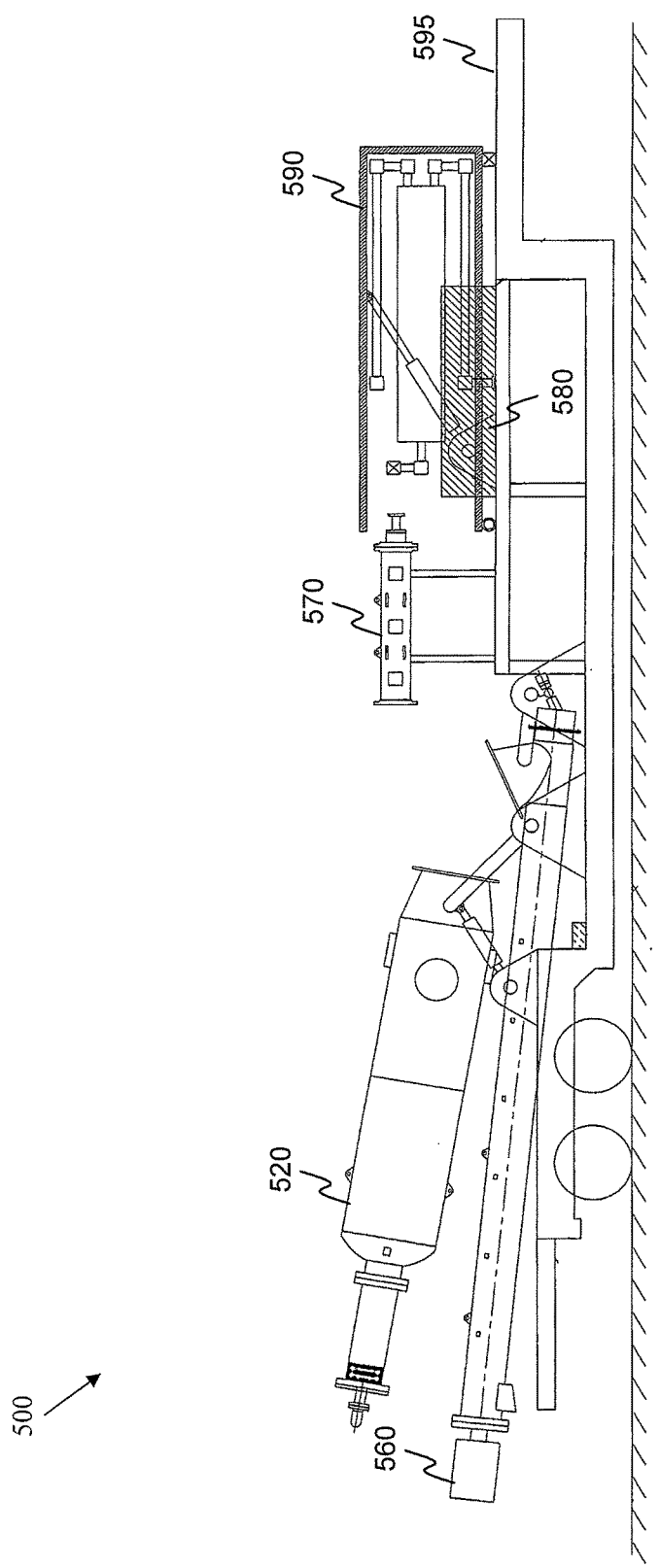

With brief reference to FIG. 7, illustrated are the collection vessel 520, auger 560, gas buster 570, choke manifold 580 and high pressure sand trap 590 in their transit positions. As illustrated, the collection vessel 520, auger 560, gas buster 570, choke manifold 580 and high pressure sand trap 590 may pivot to transition from the operational position to the transit position. Other mechanisms, however, could also be used to help the collection vessel 520, auger 560, gas buster 570, choke manifold 580 and high pressure sand trap 590 transition from the operational position to the transit position.

A backflow collection system, such as the backflow collection system of FIGS. 5-7, may be used to reclaim backflow from a wellbore. This process may begin by collecting solid and liquid matter from the wellbore using the backflow collection system. As the solid and liquid matter, as well as the gasses, enter the collection vessel, the auger may be operated in a manner to remove at least a portion of the solid matter from the collection vessel, while at the same time pressurized gas exiting the discharge port is burned.

Although the present disclosure has been described in detail, those skilled in the art should understand that they can make various changes, substitutions and alterations herein without departing from the spirit and scope of the disclosure in its broadest form.

What is claimed is:

1. A backflow collection system, comprising:
   a collection vessel consisting of only a single chamber having an upper section and a lower section, the collection vessel having a side opening configured to receive backflow from an oil/gas well, as well as a discharge port proximate an upper end of the upper section configured to discharge pressurized gas from the collection vessel; and
   an auger coupled proximate the lower section of the collection vessel, the auger configured to receive solid and liquid matter from a bottom opening in the lower section of the collection vessel, and when elevated remove at least a portion of the solid and liquid matter from the collection vessel, the collection vessel designed such that when fluid is contained therein it acts as a liquid/gas seal to prevent the pressurized gas from exiting through the bottom opening in the lower section of the collection vessel.

2. The backflow collection system of claim 1, wherein bottom walls of the lower section slant toward the bottom opening.

3. The backflow collection system of claim 2, wherein the bottom walls slant at an angle of at least about 45 degrees from vertical.

4. The backflow collection system of claim 2, wherein the bottom walls slant at an angle of at least about 70 degrees from vertical.

5. The backflow collection system of claim 1, further including a vibration mechanism coupled to at least one of the collection vessel or auger, the vibration mechanism configured to assist the auger to receive solid matter from the bottom opening in the lower section of the collection vessel.

6. The backflow collection system of claim 5, wherein the vibration mechanism is coupled to the lower section of the collection vessel.

7. The backflow collection system of claim 1, further including a replaceable abrasion plate on an opposing side of the collection vessel as the side opening.

8. The backflow collection system of claim 1, further including a gas buster positioned between the side opening in the collection vessel and the oil/gas well, the gas buster configured to reduce a velocity of the solid and liquid matter exiting the oil/gas well and entering the collection vessel.

9. The backflow collection system of claim 8, wherein the gas buster couples directly to a flange associated with the side opening in the collection vessel.

10. The backflow collection system of claim 8, wherein a cross-sectional area of the gas buster steps from a smaller value to a larger value as the gas buster approaches the collection vessel, the increasing cross-sectional area configured to reduce the velocity of the solid and liquid matter exiting the oil/gas well and entering the collection vessel.

11. The backflow collection system of claim 8, wherein the gas buster comprises a first smaller pipe having openings spaced along a length thereof, and a second larger pipe encompassing the first smaller pipe.

12. The backflow collection system of claim 1, further including a choke manifold positioned between the side opening in the collection vessel and the oil/gas well, the choke manifold configured to reduce a volume of the solid and liquid matter exiting the oil/gas well and entering the collection vessel.

13. The backflow collection system of claim 1, further including a high pressure sand trap positioned between the side opening in the collection vessel and the oil/gas well, the high pressure sand trap configured to remove a portion of the solid matter exiting the oil/gas well prior to entering the collection vessel.

14. The backflow collection system of claim 1, wherein the collection vessel is a vertical collection vessel.

15. The backflow collection system of claim 1, wherein the collection vessel and auger are configured to pivot to transition from an operational position to a transit position on a movable trailer.

16. The backflow collection system of claim 1, further including a collection receptacle, the collection receptacle including:
   an enclosure configured to collect the solid and liquid matter from the auger; and
   an elevated second auger extending into the enclosure and configured to remove the solid matter from the enclosure, wherein the elevated second auger includes a housing and a flighting, the housing and flighting configured in such a way as to promote separation of the solid matter from the liquid matter as the solid matter travels up the elevated second auger and out of the enclosure.

17. The backflow collection system of claim 16, wherein the housing has a radius of $r_h$ and the flighting has a lesser radius of $r_f$, wherein $r_f$ is less than about 90 percent of $r_h$.

18. A method for reclaiming backflow from a wellbore, comprising:
   collecting solid and liquid matter from a wellbore within a backflow collection system, the backflow collection system including;
      a collection vessel consisting of only a single chamber having an upper section and a lower section, the collection vessel having a side opening configured to receive backflow from an oil/gas well, as well as a discharge port proximate an upper end of the upper section configured to discharge pressurized gas from the collection vessel; and
      an auger coupled proximate the lower section of the collection vessel, the auger configured to receive solid and liquid matter from a bottom opening in the lower section of the collection vessel, and when elevated remove at least a portion of the solid and liquid matter from the collection vessel, the collection vessel designed such that when fluid is contained therein it acts as a liquid/gas seal to prevent the pressurized gas from exiting through the bottom opening in the lower section of the collection vessel; and
   operating the auger in a manner configured to remove at least a portion of the solid matter from the collection vessel while burning the pressurized gas exiting the discharge port.

19. A backflow management system, comprising:
   a backflow collection system, including;
      a collection vessel consisting of only a single chamber having an upper section and a lower section, the collection vessel having a side opening configured to receive backflow from an oil/gas well, as well as a discharge port proximate an upper end of the upper section configured to discharge pressurized gas from the collection vessel; and
      a first auger coupled proximate the lower section of the collection vessel, the first auger configured to receive solid and liquid matter from a bottom opening in the lower section of the collection vessel, and when elevated remove at least a portion of the solid and liquid matter from the collection vessel, the collection vessel designed such that when fluid is contained therein it acts as a liquid/gas seal to prevent the pressurized gas from exiting through the bottom opening in the lower section of the collection vessel; and a collection receptacle, including;
an enclosure configured to receive the solid and liquid matter from the first auger; and
an elevated second auger extending into the enclosure and configured to remove the solid matter from the enclosure, wherein the elevated second auger includes a housing having a radius $r_h$ and a flighting having a lesser radius $r_f$, and further wherein a relationship between the housing radius $r_h$ and flighting radius $r_f$ promotes separation of the solid matter from the liquid matter as the solid matter travels up the elevated second auger and out of the enclosure.

20. The backflow management system of claim 19, wherein $r_f$ is less than about 90 percent of $r_h$.

* * * * *

UNITED STATES PATENT AND TRADEMARK OFFICE
CERTIFICATE OF CORRECTION

PATENT NO. : 9,597,614 B2
APPLICATION NO. : 13/735879
DATED : March 21, 2017
INVENTOR(S) : Bruce Thompson Page 1 of 1

It is certified that error appears in the above-identified patent and that said Letters Patent is hereby corrected as shown below:

In the Specification

In Column 1, Line 38, after --improve the-- please delete "infectivity" and insert --injectivity--

Signed and Sealed this
Seventh Day of November, 2017

Joseph Matal
*Performing the Functions and Duties of the*
*Under Secretary of Commerce for Intellectual Property and*
*Director of the United States Patent and Trademark Office*